US008125913B2

(12) United States Patent
Longo

(10) Patent No.: US 8,125,913 B2
(45) Date of Patent: Feb. 28, 2012

(54) TESTING METHOD OF AN IC CARD INCLUDING A ZIGBEE DEVICE

(75) Inventor: Raffaele Longo, Treviso (IT)

(73) Assignee: Incard S.A., Geneva (CH)

( * ) Notice: Subject to any disclaimer, the term of this patent is extended or adjusted under 35 U.S.C. 154(b) by 397 days.

(21) Appl. No.: 12/412,931

(22) Filed: Mar. 27, 2009

(65) Prior Publication Data

US 2009/0303885 A1 Dec. 10, 2009

(30) Foreign Application Priority Data

Mar. 28, 2008 (IT) .............................. M12008A0533

(51) Int. Cl.
*G06F 11/00* (2006.01)

(52) U.S. Cl. ........ 370/242; 370/246; 370/248; 370/249; 370/250

(58) Field of Classification Search .................. 370/241, 370/242, 244–246, 248–250, 252
See application file for complete search history.

(56) References Cited

U.S. PATENT DOCUMENTS

2008/0037468 A1* 2/2008 Zisimopoulos et al. ...... 370/331
2008/0180223 A1* 7/2008 Cato et al. .................... 340/10.4
2010/0315994 A1* 12/2010 Lam ............................. 370/328

FOREIGN PATENT DOCUMENTS

KR 20070066125 6/2007

OTHER PUBLICATIONS

Eren et al., "Technical challenges for wireless instrument networks—A case study with ZigBee", IEEE Sensors Applications Symposium, Feb. 1, 2007, pp. 1-6.

Zucatto et al., "ZigBee for building control wireless sensor networks", IEEE, Microwave and Optoelectronics Conference, Oct. 9, 2007, pp. 511-515.

IEEE Standard for information technology—telecommunications and information exchange between systems—local and metropolitan area networks specific requirements part 15.4: wireless medium access control (MAC) and physical layer (PHY) specification for low-rate wireless personal area networks, Jan. 1, 2003, Part I, pp. 1-81; Part II, pp. 82-171; Part III, pp. 172-261; Part IV, pp. 262-351; Part V, pp. 352-441; Part VI, pp. 442-531; Part VII, pp. 532-621; Part VIII, pp. 622-670.

* cited by examiner

*Primary Examiner* — Hassan Kizou
*Assistant Examiner* — Siming Liu
(74) *Attorney, Agent, or Firm* — Allen, Dyer, Doppelt, Milbrath & Gilchrist, P.A.

(57) ABSTRACT

A method for testing a ZigBee device included in an IC Card includes associating a predetermined Personal Area Network (PAN) Identifier to the ZigBee device, and providing a test device, for initializing a ZigBee network. The method may include connecting the ZigBee device to the ZigBee network and transmitting the corresponding PAN Identifier to the test device. The method may include returning a fault message, indicative of a failure of connecting and transmitting, if the test device does not receive the PAN Identifier. The predetermined PAN Identifier may be stored in a memory portion of the test device and include, in the fault message, the PAN Identifier if the test device does not receive the PAN Identifier, in order to identify the ZigBee device as a defective device.

25 Claims, 3 Drawing Sheets

TESTING METHOD OF AN IC CARD INCLUDING A ZIGBEE DEVICE

FIELD OF THE INVENTION

The present invention relates to a method for testing a ZigBee device included in an IC Card. The present invention also relates to a test device for testing a ZigBee device of the type included in an IC Card and associated to a predetermined Personal Area Network (PAN) Identifier.

BACKGROUND OF THE INVENTION

A method for testing an integrated circuit (IC) Card may include a phase for checking that hardware and software resources of the IC Card may communicate with a read-write device, according to a predetermined communication standard. More particularly, the IC Card may include a System on Chip including a memory portion, microcontroller, and a set of contact pads for an electrical connection with the read-write device.

As schematically represented in FIG. 1, the IC Card 1 may also include a ZigBee device 2*a* including an antenna 7 for wireless communication with a ZigBee Controller, according to a standard IEEE 802.15.4. The method for testing such IC Card includes testing both the communication with the read-write device through the electrical connection based on contact pads, and the communication with the ZigBee Controller through a ZigBee network initialized by the ZigBee Controller. More particularly, the IC Card 1 may include a first System on Chip including hardware resources for the wireless communication with the ZigBee device, and a second System on Chip including hardware resources for the communication with the read-write device. In another hardware configuration of the IC Card, both the hardware resources for implementing the communication with the read-write device and the wireless communication with the ZigBee Controller may be included in a single System on Chip.

In the following description, not depending on the System on Chip(s) configuration, the term ZigBee device is used to refer to the hardware and software resources supporting the communication with the ZigBee Controller, while the term IC device is used to refer to the hardware and software resources for implementing the communication with the read-write device. More particularly, the method for testing the IC Card should provide that not only the IC device is able to communicate with the read-write device, but also that the ZigBee device is able to communicate with the ZigBee Controller, according to the respective standards. A problem of such a method for testing is that checking the ZigBee device takes much more time than checking the IC device.

For testing the ZigBee device, wireless communication between the Zigbee Controller and the ZigBee device should be established, including a step for initializing a ZigBee network through the ZigBee Controller, a step for connecting the ZigBee device to the ZigBee network, a step for identifying the ZigBee device through the ZigBee Controller, and a step for transmitting one or more wireless messages to test the transmission capability of the ZigBee device. More particularly, it is worth noting that IC Card manufacturers are following the emerging trend of using IC Cards including a Zigbee device for a great number of control applications. Thus, the IC Card test time is more often penalized by the time for checking the ZigBee device. The demand for interoperability, together with the opportunity costs related with time-to-market, drives the need for compliance testing, and making a time-efficient, reliable, and cost-effective test approach desirable.

Another problem of such a method for testing is that the ZigBee Controller typically cannot directly identify and return an identification code of a defective ZigBee device. Since a defective ZigBee device is typically unable to connect and transmit over the ZigBee network, for example, due to a broken antenna 7, the ZigBee Controller typically cannot identify it. In other words, the defective ZigBee device may be detected only indirectly for the fact that a predetermined time has elapsed without receiving a response from it. Such a method for testing returns a fault message indicative of a failure of a connection and/or transmission of the ZigBee device without identifying it. This method is not advantageous, especially when a plurality of ZigBee devices, for example, located on a production line, should be tested.

More particularly, it is generally known to associate a predetermined Personal Area Network (PAN) Identifier to the ZigBee device so that a test device may detect such Identifier and identify the corresponding ZigBee device when such ZigBee device connects to the ZigBee network. It is typically not possible to identify the corresponding ZigBee device when it is unable to connect to the ZigBee Network, since the PAN Identifier is not transmitted.

The technical problem is that of providing a method of testing one or more IC Cards, including a respective ZigBee device, avoiding that the time involving the checking of the Zigbee device heavily penalizes the time for checking the IC device of such IC Cards, and providing that a defective ZigBee device may be identified even if a ZigBee communication with the ZigBee Controller cannot be established, may allow IC Card manufacturers to get their IC Cards tested, validated, and released as quickly as possible.

SUMMARY OF THE INVENTION

One approach of the present embodiments is to associate an Identifier to the ZigBee device included in an IC Card to be tested, and to pre-store such Identifier in a test device that initializes a ZigBee network whereto the ZigBee device may connect. ZigBee is an example of a low-cost, low-power, wireless mesh networking protocol or standard. In this way, if the ZigBee device connects to the ZigBee network and transmits the corresponding Identifier, the test device detects the corresponding Identifier and returns a positive value for the test. In contrast, if the ZigBee device is unable to connect to the ZigBee network, the test device identifies such ZigBee device based upon the pre-stored Identifier for which it has not received a corresponding Identifier, and returns a fault message identifying the defective ZigBee device.

According to such an approach, the technical problem described above is addressed by a method for testing a ZigBee device included in an IC Card. The method may include associating a predetermined Personal Area Network (PAN) Identifier to the ZigBee device, providing a test device which initializes a ZigBee network. The method may also include connecting the ZigBee device to the ZigBee network and transmitting the corresponding PAN Identifier to the test device. A fault message indicative of a failure of the step of connecting and transmitting may be returned if the test device does not receive the PAN Identifier. The method may also include pre-storing the predetermined PAN Identifier in a memory portion of the test device, and including, in the fault message, the PAN Identifier pre-stored in the memory portion, if the test device does not receive the PAN Identifier, to identify the ZigBee device as a defective device.

The technical problem described above is also addressed by a test device for testing a ZigBee device of the type included in an IC Card and associated to a predetermined PAN Identifier. The devices may include a controller for initializing a ZigBee network whereto the ZigBee device may connect and transmit the corresponding PAN Identifier. The device may also include an indicator for returning a fault message, indicative that such ZigBee device is unable to connect and transmit, if the PAN Identifier is not received. The device may also include a memory portion of the test device that pre-stores the predetermined PAN Identifier. The fault message may include the PAN Identifier pre-stored in the memory portion for identifying the ZigBee device as a defective device.

Advantageously, according to the method and the test device of the present embodiments, the ZigBee devices included in a plurality of IC Cards may be more easily and rapidly checked, without slowing down the time for testing the overall hardware and software resources of the IC Card.

Advantageously, according to the method and device of the present embodiments, checking communication between the ZigBee device and the ZigBee Coordinator may take no more time than checking communication between an IC device of such IC Card and a read-write device. Moreover, the test device according to the present embodiments may identify the defective IC Card by returning a list of Identifiers associated to defective IC Cards. Advantageously, the defective IC Cards may be more easily selected since its Identifiers stored inside a memory portion of the IC Card may be read through the read-write device, via contact pads, or it may be written on a support of the IC Card so that a user may directly identify it.

Other features and advantages of the method for testing and the corresponding test device according to the embodiments will be apparent from the following description of an embodiment thereof, given by way of non-limitative example with reference to the accompanying drawings.

DETAILED DESCRIPTION OF THE PREFERRED EMBODIMENTS

With reference to the annexed drawings, a test device 4 for testing an IC Card 1*a* includes a ZigBee device 2*a*. The test device 4 initializes a ZigBee network whereto the ZigBee device 2*a* may connect. More particularly, the ZigBee device 2*a* is associated to a predetermined Personal Area Network (PAN) Identifier 3*a*, stored in a memory portion of the IC Card 1*a*. The ZigBee device 2*a* connects to the ZigBee network and transmits the predetermined PAN Identifier 3*a* to the test device 4. However, if the ZigBee device 2*a* is defective, it typically cannot transmit the corresponding PAN Identifier 3*a* over the ZigBee network so that the test device 4 does not receive such PAN Identifier 3*a*.

The predetermined PAN Identifier 3*a* of the IC Card 1*a* to be tested is pre-stored in a memory portion 6 of the test device 4. More particularly, the wording "pre-stored" has been used for specifying that such PAN Identifier 3*a* is stored in the memory portion 6 before the test device 4 and the ZigBee device 2 are connected.

More particularly, after the PAN Identifier 3*a* is pre-stored inside the memory portion 6 and the ZigBee network is initialized, the test device 4 detects if the ZigBee device 2*a* transmits the PAN Identifier 3*a*. As already stated above, if the ZigBee device 2*a* is a defective ZigBee device, it cannot transmit the corresponding PAN Identifier 3A over the ZigBee network so that the test device 4 does not receive such PAN Identifier 3*a*.

If the test device 4 does not detect the PAN Identifier 3*a* corresponding to the PAN Identifier 3*a* pre-stored in the memory portion 6, it returns a fault message, including the pre-stored PAN Identifier 3*a*. In other words, the test device 4 outputs the pre-stored PAN Identifier 3*a* corresponding to the defective ZigBee device even if it has not received the PAN Identifier 3*a* from the ZigBee device.

Figure 1:
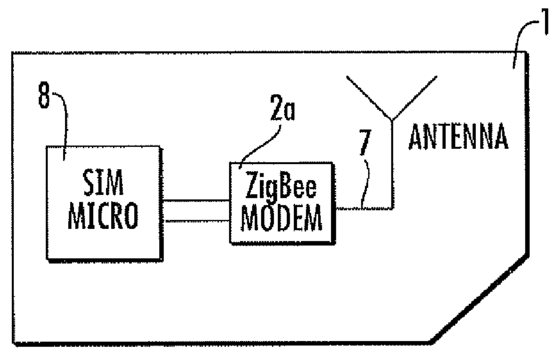
FIG. 1 schematically represents an IC Card including a ZigBee device, according to the prior art.
Figure 2A:
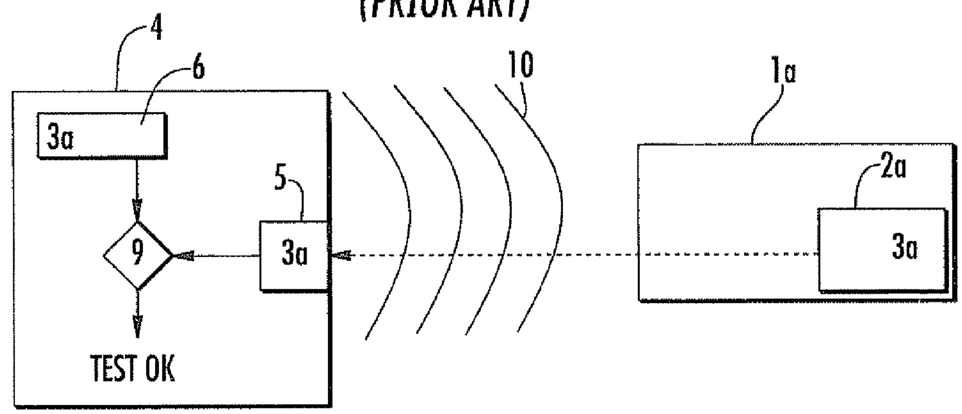
FIG. 2*a* schematically represents a method for testing the IC Card of FIG. 1, according to the present invention.

More particularly, with reference to FIG. 2*a*, an execution of the method for the detection of a ZigBee device 2*a*, included in an IC Card 1*a*, resulting in a positive test is illustrated. The test device 4 initializes the ZigBee network 10 whereto the ZigBee device 2*a* may connect for transmitting the PAN Identifier. The test device 4 pre-stores the PAN Identifier 3*a* of the ZigBee device 2*a* to be tested inside a memory portion 6. Block 9 receives, as input, the pre-stored PAN Identifier 3*a*. When the ZigBee device 2*a* connects to the ZigBee network 10 and transmits the PAN Identifier 3*a*, block 9 receives, as input, the transmitted PAN Identifier 3*a* and compares it with the pre-stored PAN Identifier 3*a*. The test device 4 returns a positive value, together with the PAN Identifier 3*a* of the ZigBee device 2*a* tested.

Figure 2B:
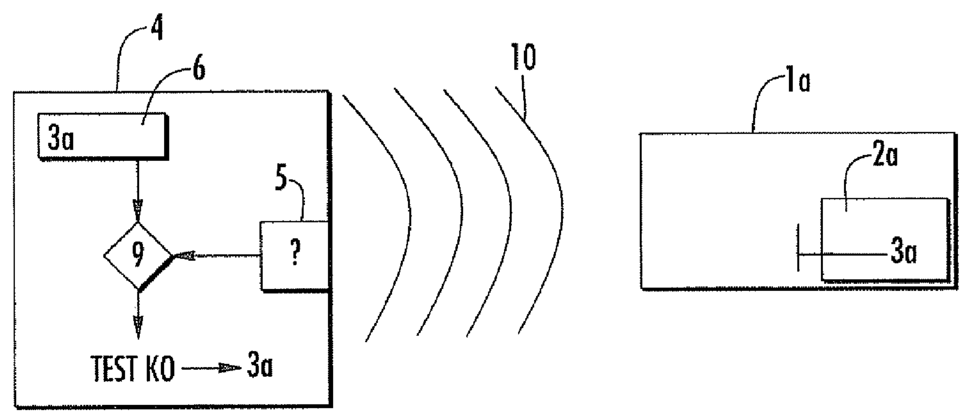
FIG. 2*b* schematically represents a method for testing a defective IC Card, according to the present invention.

With reference to FIG. 2*b*, an execution of the method for the detection of a defective ZigBee device 2*a*, included in an IC Card 1*a*, resulting in a negative test and in a corresponding fault message is illustrated. As described above, the test device 4 initializes the ZigBee network 10 and pre-stores the PAN Identifier 3*a* of the ZigBee device 2*a* to be tested inside the memory portion 6. Block 9 receives, as input, the pre-stored PAN Identifier 3*a* from the memory portion 6. However, in this case, the ZigBee device 2*a* typically cannot connect to the ZigBee network 10 and typically cannot transmit the PAN Identifier 3*a*. Consequently, block 9 does not receive the PAN Identifier 3*a* from the ZigBee device 2*a* and typically cannot compare it with the pre-stored PAN Identifier 3*a*. The test device 4 returns a negative value, together with the PAN Identifier 3*a* of the defective ZigBee device 2*a*. As it may be appreciated by the following description, the method is particularly advantageous when a plurality of IC Cards, including respective ZigBee devices, are tested.

Figure 3:
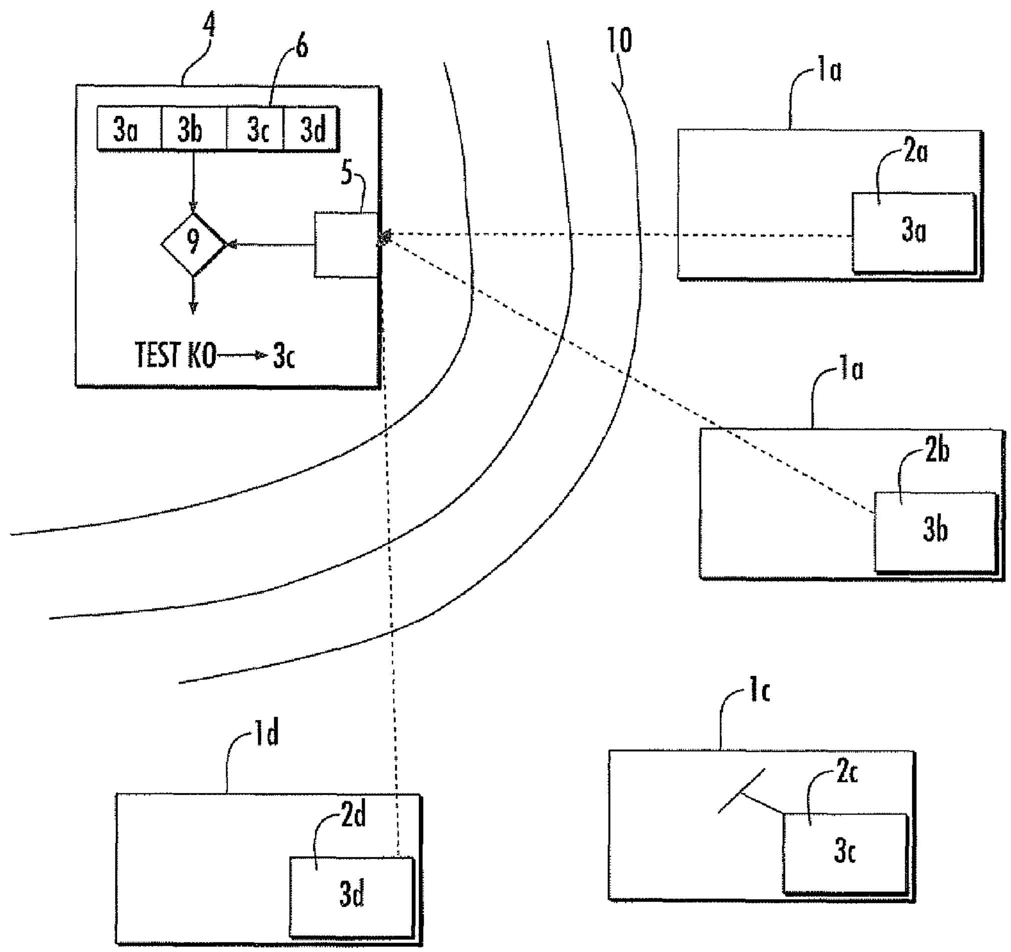
FIG. 3 schematically represents a method for testing a plurality of IC Cards, according to the present invention.

With reference to FIG. 3, a plurality of IC Cards 1*a*, 1*b*, 1*c*, 1*d* are represented, including corresponding ZigBee devices 2*a*, 2*b*, 2*c*, 2*d*, which are associated to respective PAN Identifiers 3*a*, 3*b*, 3*c*, 3*d*. A test device 4 includes a memory portion 6 pre-storing the PAN Identifiers 3*a*, 3*b*, 3*c*, 3*d* associated to the IC Cards to be tested. Block 9 receives, as input, the pre-stored PAN Identifiers 3*a*, 3*b*, 3*c*, 3*d*. The test device 4 initializes a ZigBee network 10 so that the ZigBee devices 2*a*, 2*b*, 2*c*, 2*d* connect and transmit the respective PAN Identifiers 3*a*, 3*b*, 3*c*, 3*d*.

Block 9 also receives, as input, the transmitted PAN Identifiers 3*a*, 3*b*, 3*c*, 3*d* and compares them with the pre-stored PAN Identifiers 3*a*, 3*b*, 3*c*, 3*d*. As illustrated in FIG. 3, the ZigBee devices 2*a*, 2*b*, 2*d* connect and transmit the respective PAN Identifiers 3*a*, 3*b*, 3*d* while the ZigBee device 2*c*, for example, due to a broken link between the antenna and the circuitry, is unable to send the PAN Identifier 3*c*.

Figure 4:
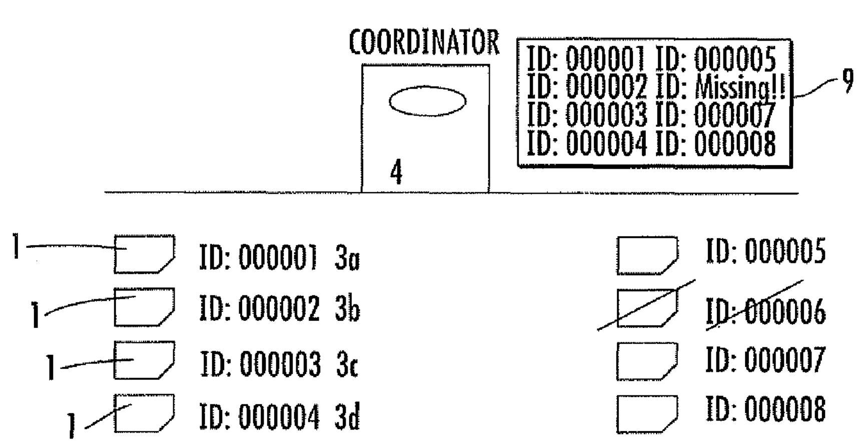
FIG. 4 schematically represents a phase of the method for testing of FIG. 3.

FIG. 4 illustrates a step of the method wherein block 9 matches a plurality of transmitted PAN Indetificators, including codes 000001, 000002, 000003, 000004, 000005, 000006, 000007, 000008, to corresponding pre-stored PAN Indetificators that include the same codes 000001, 000002, 000003, 000004, 000005, 000007, 000008. Block 9 is unable to match the pre-stored PAN Indetificators including the code 000006, because the corresponding ZigBee device 2*c* is unable to transmit it. So a fault message "missing!!" is generated, and the code 000006 corresponding to the defective ZigBee device 2*c* is identified.

Advantageously, the PAN Identifier 2*a* associated to the ZigBee device 2*a* may be written on a physical support of the IC Card so that defective ZigBee devices may be easily and directly identified by a user and removed by the production line. However, since the PAN Identifier 2*a* is also stored inside the IC Card 1*a*, it may be read through a read-write device programmed to read the IC Card, for example, via contact pads.

Hereafter, the main steps provided by the method are resumed. The method includes associating a predetermined PAN Identifier 3*a* to the ZigBee device 2*a*, and providing a test device 4, which initializes a ZigBee network. The method also includes connecting the ZigBee device 2*a* to the ZigBee network and transmitting the corresponding PAN Identifier 3*a* to the test device 4. The method returns a fault message, indicative of a failure of the step of connecting and transmitting, if the test device 4 does not receive the PAN Identifier 3*a*.

The method also includes the steps of pre-storing the predetermined PAN Identifier 3*a* in a memory portion 6 of the test device 4, and including, in the fault message, the PAN Identifier 3*a* pre-stored in the memory portion 6, if the test device 4 does not receive the PAN Identifier 3*a*, to identify the ZigBee device 2*a* as a defective device.

Advantageously, the method may be used to detect a plurality of IC Cards by connecting the plurality of IC Cards 1*a*, 1*b*, 1*c*, 1*d* including respective ZigBee devices 2*a*, 2*b*, 2*c*, 2*d* associated to predetermined PAN Identifiers 3*a*, 3*b*, 3*c*, 3*d* to the ZigBee network and transmitting the corresponding PAN Identifiers 3*a*, 3*b*, 3*c*, 3*d* to the test device 4. The method may also be used to detect a plurality of IC Cards by pre-storing the predetermined PAN Identifiers 3*a*, 3*b*, 3*c*, 3*d* in the memory portion 6 of the test device 4, and including, in the fault message, the PAN Identifiers 3*a*, 3*b*, 3*c*, 3*d* pre-stored in the memory portion 6 corresponding to the PAN Identifiers 3*a*, 3*b*, 3*c*, 3*d* not received by the test device 4, in order to identify the corresponding ZigBee devices 2*a*, 2*b*, 2*c*, 2*d* as defective devices. The step of pre-storing the predetermined PAN Identifier(s) 3*a*, 3, 3*c*, 3*d* is executed before the step of transmitting the PAN Identifier(s) 3*a*, 3*b*, 3*c*, 3*d* to the test device 4.

The method also matches the PAN Identifier(s) 3*a*, 3*b*, 3*c*, 3*d* transmitted by the corresponding ZigBee devices 2*a*, 2*b*, 2*c*, 2*d* to the pre-stored PAN Identifier (s) 3*a*, 3*b*, 3*c*, 3*d* and returns a positive test message for the ZigBee devices 2*a*, 2*b*, 2*c*, 2*d*, for which the transmitted PAN Identifier(s) 3*a*, 3*b*, 3*c*, 3*d* match with the pre-stored PAN Identifier(s) 3*a*, 3*b*, 3*c*, 3*d*. The PAN Identifier(s) 3*a*, 3, 3*c*, 3*d* is stored in a memory portion of the corresponding IC Card 1*a*, 1*b*, 1*c*, 1*d*.

Figure 5:
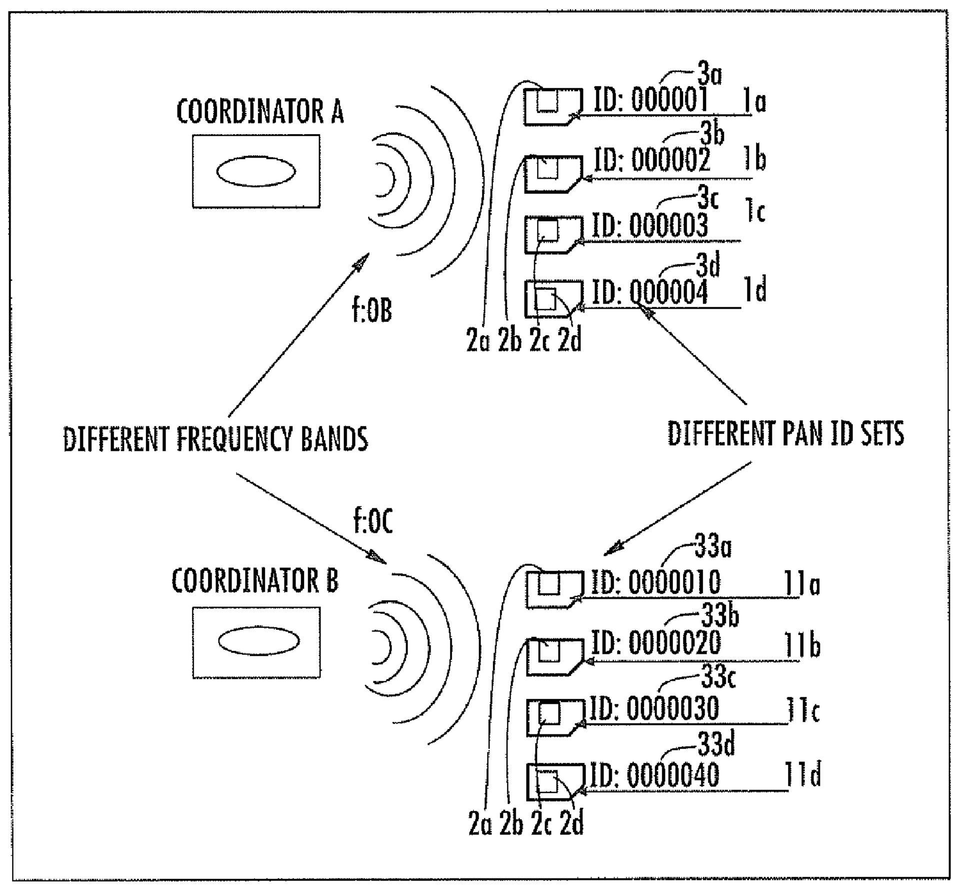
FIG. 5 schematically represents test devices working in a same environment with different frequencies for identifying respective PAN Ids, according to the present invention.

According to the method, a plurality of test devices 4, also illustrated in FIG. 5, as Coordinator A and Coordinator B, may be simultaneously used for testing a plurality of IC Cards, including respective ZigBee devices. For sake of clarity, the term "test device" is intended as an apparatus or a testing line including a testing head for testing the ZigBee.

A first test device, or Coordinator A, is provided to test a first set of IC Cards 1*a*, 1*b*, 1*c*, 1*d*, and a second test device or Coordinator B is provided to test a second set of IC Cards 11*a*, 11*b*, 11*c*, 11*d*. The IC Cards 1*a*, 1*b*, 1*c*, 1*d*, 11*a*, 11*b*, 11*c*, 11*d* include corresponding ZigBee devices, respectively, 2*a*, 2*b*, 2*c*, 2*d*, 22*a*, 22*b*, 22*c*, 22*d*.

Since the ZigBee devices may communicate over a range of 100 meters, even with some interposing piece of fabric, and the Coordinators A and B may be located, for example, at a distance of few meters, the method provides shielding of the test devices A and B to avoid collisions during the test.

In other words, as will be apparent from the following description, the method provides that the Coordinator A tests the ZigBee devices 2*a*, 2*b*, 2*c*, 2*d* of the first set without being disturbed by the ZigBee devices 22*a*, 22*b*, 22*c*, 22*d* of the second set, even if such devices 22*a*, 22*b*, 22*c*, 22*d* are located in a range wherein the Coordinator A is operative. At the same time, the method provides that the Coordinator B may test the ZigBee devices 22*a*, 22*b*, 22*c*, 22*d* of the second set without being disturbed by the ZigBee devices 2*a*, 2*b*, 2*c*, 2*d* of the first set.

More particularly, according to the method, the ZigBee devices 2*a*, 2*b*, 2*c*, 2*d* of the first set are associated with a first set of PAN Identifiers 3*a*, 3*b*, 3*c*, 3*d*, while the ZigBee devices 22*a*, 22*b*, 22*c*, 22*d* of the second set are associated with a second set of PAN Identifiers 33*a*, 33*b*, 33*c*, 33*d*, different from the PAN Identifiers of the first set. Advantageously, this association is made to separate the IC Cards 1*a*, 1*b*, 1*c*, 1*d* to be tested by the first Coordinator A with respect to the IC Cards 11*a*, 11*b*, 11*c*, 11*d* to be tested by the second Coordinator B. This may avoid the use of a common database storing the PAN IDs of all the IC Cards 1*a*, 1*b*, 1*c*, 1*d*, 11*a*, 11*b*, 11*c*, 11*d* and a complex database management for detecting if a PAN ID received by a Coordinator A or B is associated to the first or second set of ZigBee devices, resulting in an undesirable "Seek and Load" time.

Advantageously, the association of separate PAN Identifiers to the corresponding Coordinators A and B may be executed one time and for testing purposes. In this way, the "Seek and Load" time is void since the specific PAN Identifiers are loaded into the test devices and the corresponding PAN IDs are loaded in the ZigBee devices before testing, for example, during an assembly or personalization phase of the IC Cards. Advantageously, a common database is generally not required, nor a complex database management, since each test device works locally with specific and dedicated PAN Identifiers.

The method is now briefly described with reference to FIG. 5, wherein two sets of IC Cards 1*a*, 1*b*, 1*c*, 1*d* and 11*a*, 11*b*, 11*c*, 11*d* are tested from test devices, respectively A and B. The IC Cards include corresponding ZigBee devices 2*a*, 2*b*, 2*c*, 2*d* and 22*a*, 22*b*, 22*c*, 2*d*. More particularly, the Coordinator A is programmed to test the ZigBee devices of the first set of IC Cards 1*a*, 1*b*, 1*c*, 1*d*, associated to corresponding PAN IDs 000001, 000002, 000003, 000004 and the second Coordinator B is programmed to test the ZigBee devices of the second set of IC Cards 11*a*, 11*b*, 11*c*, 11*d*, associated to the PAN IDs 000010, 000020, 000030, 000040. The PAN Identifiers are loaded on the respective Coordinator A or B by a programming head of a production/testing line so that each production line works with reference to the PAN IDs associated to the predetermined set of IC Cards.

The method also manages the transmission frequency of different test devices to avoid Radio Frequency (RF) transmitted by the first Coordinator A interfering with the RF transmitted by the second Coordinator B, and vice versa. Each ZigBee device and test device may communicate in a range of 100 meters. The method shields different test lines from one another, avoiding interferences in the transmission of signals and erroneous "Error Messages."

It is worth noting that a ZigBee standard, complying with the IEEE 802.15.4 standard, specifies operation in the 2.45 GHz band. According to the specification, 16 RF channels are available, 0B, 0C, 0D, 0E, 0F, 10, 11, 12, 13, 14, 15, 16, 17, 18, 19, 1A for transmission.

The method provides that two or more test devices simultaneously use different RF channels, complying with the IEEE 802.15.4 standard. For example, two or more production/testing lines working together in a small environment and located at a reciprocal distance d less than 100 meters, transmit over a different RF channel, as illustrated in FIG. 5 wherein the Coordinator A is associated to the RF channel 0B, and Coordinator B is associated to the REF channel 0C. In other words, each test device transmits over a predetermined RF channel so that radio frequency interferences may be avoided.

According to another embodiment, the radio frequency interferences are also typically avoided when two or more test devices are not associated to a predetermined RF channel, but they transmit over all the available RF channels. More particularly, the two or more test devices are synchronized to transmit over different RF Channels in a same time slot T. For example, Coordinator A and Coordinator B may use all the RF channels, avoiding interferences according to Table 1 below:

TABLE 1

| Time Slot | T0 | T1 | T2 | T3 | T4 | T5 | T6 | . . . |
|---|---|---|---|---|---|---|---|---|
| Coordinator A | | | | | | | | |
| RF Channel | 0B | 0C | 0D | 0E | 0F | 10 | 11 | . . . |
| Coordinator B | | | | | | | | |
| RF Channel | 10 | 11 | 12 | 13 | 14 | 15 | 16 | . . . |

A testing sequence, sent from the test devices to the ZigBee devices, are transmitted in time slots. A test device sends the test sequence over RF channels available in a current time slot, in a sequential way. In other words, for each time slot, the test devices transmit over a single and different RF channel.

In another embodiment, the method provides that the Coordinator A and Coordinator B do not use a same subsequent time slot or neighboring RF channels. For example, with reference to Table 1 above, the method may avoid that in time slot T0 the Coordinator A transmits over RF channel 11 and Coordinator B over the neighboring RF channel 12, but if Coordinator A transmits over RF channel OB, Coordinator B transmits over RF channel 10. This allows easier synchronizing of the transmission.

Advantageously, according to the method, it may be possible to use, in a same environment, several test devices regardless of space and shielding constraints, and without modifications to the test devices. The present embodiments also relate to a test device 4 for testing a ZigBee device 2*a* associated with a predetermined PAN Identifier 3*a*, included in an IC Card 1*a*. More particularly, the test device 4 includes a controller for initializing a ZigBee network, whereto the ZigBee device 2*a* may connect for transmitting the corresponding PAN Identifier 3*a*. The test device 4 also includes a memory portion 6 for pre-storing the predetermined PAN Identifier 3*a* and a detector for detecting the PAN Identifier 3*a* transmitted from the ZigBee device 2*a*. More particularly, the test device includes an output for returning the PAN Identifier 3*a* stored in the memory portion 6 if the step of detecting does not detect a PAN Identifier 3*a* transmitted from the ZigBee device 2*a* corresponding to the PAN Identifier 3*a* stored in the memory portion 6. Advantageously, the test device 4 may be used for testing a plurality of IC Cards 1, 1*b*, 1*c*, 1*d* including corresponding ZigBee devices 2*a*, 2*b*, 2*c*, 2*d* to be tested.

The ZigBee devices 2*a*, 2*b*, 2*c*, 2*d* to be tested are associated to predetermined PAN Identifiers 3*a*, 3*b*, 3*c*, 3*d*, which are prestored in the memory portion 6 of the test device 4 and in a memory portion of the respective IC Cards 1, 1*b*, 1*c*, 1*d*. The test device 4 includes the detector to detect the PAN Identifiers 3*a*, 3*b*, 3*c*, 3*d* transmitted from the respective ZigBee devices 2*a*, 2*b*, 2*c*, 2*d*. The output returns a list of PAN Identifiers 3*c* stored in the memory portion 6 if the detector does not detect that a PAN Identifier 3*c* corresponding to a pre-stored PAN Identifier 3*c* are not transmitted from the respective ZigBee device 2*c* to the test device 4. Hereafter the main elements of the test device 4 are resumed. The test device 4 includes a controller for initializing a ZigBee network whereto the ZigBee device 2*a* may connect and transmit the corresponding PAN Identifier 3*a*. The device includes a controller for returning a fault message, indicative that such ZigBee device 2*a* is unable to connect and transmit (if the PAN Identifier 3 is not received). The device also includes a memory portion 6 pre-storing the predetermined PAN Identifier 3*a*. The fault message includes the PAN Identifier 3*a* pre-stored in the memory portion 6 for identifying the ZigBee device 2*a* as a defective device.

The test device may be used to test a plurality of IC Cards and includes the memory portion 6 pre-storing a plurality of predetermined PAN Identifiers 3*a*, 3*b*, 3*c*, 3*d* associated to corresponding ZigBee devices 2*a*, 2*b*, 2*c*, 2*d* included in respective IC Cards 1, 1*b*, 1*c*, 1*d*. The fault message includes the PAN Identifiers 3*a*, 3*b*, 3*c*, 3*d* pre-stored in the memory portion 6 corresponding to the PAN Identifiers 3*a*, 3*b*, 3*c*, 3*d* not received to identify the corresponding ZigBee devices 2*a*, 2*b*, 2*c*, 2*d* as defective devices.

The test device 4 also includes a matcher for matching the PAN Identifier(s) 3*a*, 3*b*, 3*c*, 3*d* transmitted by the corresponding ZigBee devices 2*a*, 2*b*, 2*c*, 2*d* to the PAN Identifier(s) 3*a*, 3*b*, 3*c*, 3*d* pre-stored in the memory portion 6. A detecting portion is included for receiving the PAN Identifier 3*a*, 3*b*, 3*c*, 3*d* when the IC Cards are located within a predetermined range.

Advantageously, according to the method and the test device, the ZigBee devices included in a plurality of IC Cards may be checked at an increased pace and without slowing down the time for testing the overall hardware and software resources of the IC Card. Advantageously, checking a communication between the ZigBee device and the ZigBee Coordinator takes a little more time than checking a communication between the IC Card and a read-write device, connected through contact pads.

Advantageously, the test device identifies the defective IC Card by returning a list of Identifiers associated to the defective IC Cards. Advantageously, the defective IC Cards may be selected at anytime since its Identifier, stored inside a memory portion of the IC Card, may be read through the read-write device, via contact pads, or it may be written on a support of the IC Card so that a user may identify it.

The invention claimed is:

1. A method for testing at least one ZigBee device included in an IC Card, comprising:

associating a Personal Area Network (PAN) identifier to the at least one ZigBee device;

providing a test device for initializing a ZigBee network;

connecting the at least one ZigBee device to the ZigBee network and transmitting a corresponding PAN identifier to the test device; and returning a fault message indicative of a failure of the connecting and transmitting, if the test device does not receive the corresponding PAN identifier, returning the fault message comprising pre-storing the PAN identifier in a memory portion of the test device, and including, in the fault message, the PAN identifier pre-stored in the memory portion if the test device does not receive the corresponding PAN identifier for identifying the at least one ZigBee device as a defective device.

2. The method according to claim 1 wherein the at least one ZigBee device comprises a plurality of ZigBee devices included in a plurality of IC Cards respectively; wherein connecting the at least one ZigBee device to the ZigBee network comprises connecting the plurality of IC Cards including the respective ones of the plurality of ZigBee devices associated to PAN identifiers to the ZigBee network and transmitting the corresponding PAN identifiers to the test device; wherein pre-storing the PAN identifier comprises pre-storing the PAN identifiers in the memory portion of the test device; and wherein including, in the fault message, the PAN identifier comprises including, in the fault message, the PAN identifiers pre-stored in the memory portion corresponding to the PAN identifiers not received by the test device.

3. The method according to claim 1 wherein pre-storing the PAN identifier is executed before the transmitting of the corresponding PAN identifier to the test device.

4. The method according to claim 2 further comprising:

providing at least a second test device for initializing a second ZigBee network;

connecting a second set of IC Cards including a respective second set of ZigBee devices associated with a second set of PAN identifiers to the second ZigBee network and transmitting corresponding ones of the second set of PAN identifiers to the at least second test device;

pre-storing the second set of PAN identifiers in a memory portion of the second test device;

returning a second fault message, including the corresponding ones of the second set of PAN identifiers, indicative of a failure of the connecting and transmitting, if the at least second test device does not receive the PAN identifiers of the second set of ZigBee devices;

the PAN identifiers associated with ZigBee devices being different from the second set of PAN identifiers associated with second set of ZigBee devices.

5. The method according to claim 4 wherein the test device and the at least second test device transmit over RF frequencies compliant with a IEEE 802.15.4 standard.

6. The method according to claim 5 wherein the test device and the at least second test device transmit over a first and a second frequency of the RF frequencies respectively, the first frequency being different from the second frequency.

7. The method according to claim 5 wherein the test device and the at least second test device transmit over the RF frequencies so that when the test device transmits over a first frequency, the at least second test device transmits over a second frequency different from the first frequency.

8. The method according to claim 7 wherein the first and second frequencies are selected so that they are not neighboring inside the RF frequencies.

9. The method according to claim 8 wherein the test device and the at least second test device transmit during time slots.

10. The method according to claim 1 wherein returning a fault message further comprises matching the corresponding PAN identifier transmitted by the at least one ZigBee device to a respective pre-stored PAN identifier.

11. The method according to claim 10 further comprising returning a positive test message for the at least one ZigBee device when the corresponding PAN identifier transmitted matches the pre-stored PAN identifier.

12. The method according to claim 1 wherein the corresponding PAN identifier is stored in a memory portion of the IC Card.

13. A method for testing at least one wireless mesh network protocol device included in an IC Card, comprising:

associating a Personal Area Network (PAN) identifier to the at least one wireless mesh network protocol device;

providing a test device for initializing a wireless mesh network protocol network;

connecting the at least one wireless mesh network protocol device to the wireless mesh network protocol network and transmitting a corresponding PAN identifier to the test device; and returning a fault message indicative of a failure of the connecting and transmitting, if the test device does not receive the corresponding PAN identifier, returning the fault message comprising pre-storing the PAN identifier in a memory portion of the test device, and including, in the fault message, the PAN identifier pre-stored in the memory portion if the test device does not receive the corresponding PAN identifier for identifying the wireless mesh network protocol device as a defective device.

14. The method according to claim 13 wherein the at least one wireless mesh network protocol device included in an IC Card comprises a plurality of wireless mesh network protocol devices included in a plurality of IC Cards respectively; wherein connecting the at least one wireless mesh network protocol device to the wireless mesh network protocol network comprises connecting the plurality of IC Cards including the respective wireless mesh network protocol devices associated to PAN identifiers to the wireless mesh network protocol network and transmitting the corresponding PAN identifiers to the test device; wherein pre-storing the PAN identifier comprises pre-storing the PAN identifiers in the memory portion of the test device; and wherein including, in the fault message, the PAN identifier comprises including, in the fault message, the PAN identifiers pre-stored in the memory portion corresponding to the PAN identifiers not received by the test device.

15. The method according to claim 13 further comprising:

providing at least a second test device for initializing a second wireless mesh network protocol network;

connecting a second set of IC Cards including a respective second set of wireless mesh network protocol devices associated with a second set of PAN identifiers to the second wireless mesh network protocol network and transmitting corresponding ones of the second set of PAN identifiers to the at least second test device;

pre-storing the second set of PAN identifiers in a memory portion of the second test device;

returning a second fault message, including the corresponding ones of the second set of PAN identifiers, indicative of a failure of the connecting and transmitting, if the at least second test device does not receive the PAN identifiers of the second set of wireless mesh network protocol devices;

the PAN identifiers associated with wireless mesh network protocol devices being different from the second set of PAN identifiers associated with second set of wireless mesh network protocol devices.

16. A method for testing a ZigBee device included in an IC Card, comprising:

associating a Personal Area Network (PAN) identifier to the ZigBee device;

providing a test device for initializing a ZigBee network;

connecting the ZigBee device to the ZigBee network and transmitting a corresponding PAN identifier to the test device; and returning a fault message indicative of a failure of the connecting and transmitting, if the test device does not receive the corresponding PAN identifier, returning the fault message comprising pre-storing the PAN identifier in a memory portion of the test device, including, in the fault message, the PAN identifier pre-stored in the memory portion if the test device does not receive the corresponding PAN identifier for identifying the ZigBee device as a defective device, and matching the corresponding PAN identifier transmitted by the ZigBee device to a respective pre-stored PAN identifier;

the corresponding PAN identifier being stored in a memory portion of the IC Card.

17. The method according to claim 16 wherein pre-storing the PAN identifier is executed before the transmitting of the corresponding PAN identifier to the test device.

18. The method according to claim 16 further comprising:

providing at least a second test device for initializing a second ZigBee network;

connecting a second set of IC Cards including a respective second set of ZigBee devices associated with a second set of PAN identifiers to the second ZigBee network and transmitting corresponding ones of the second set of PAN identifiers to the at least second test device;

pre-storing the second set of PAN identifiers in a memory portion of the second test device;

returning a second fault message, including the corresponding ones of the second set of PAN identifiers, indicative of a failure of the connecting and transmitting, if the at least second test device does not receive the PAN identifiers of the second set of ZigBee devices;

the PAN identifiers associated with ZigBee devices being different from the second set of PAN identifiers associated with second set of ZigBee devices.

19. A test device for testing a ZigBee device included in an IC Card and associated with a Personal Area Network (PAN) identifier, the test device comprising:

a initialization controller for initializing a ZigBee network whereto the ZigBee device may connect and transmit a corresponding PAN identifier;

a return controller for returning a fault message indicating that the ZigBee device is unable to connect and transmit if the corresponding PAN identifier is not received; and a memory portion for pre-storing the PAN identifier;

the fault message including the pre-stored PAN identifier for identifying the ZigBee device as a defective device.

20. The test device according to claim 19 wherein the test device is for testing a plurality of ZigBee devices associated with a plurality of PAN identifiers, each ZigBee device being included in an IC Card and associated with a corresponding PAN identifier; and wherein said memory portion pre-stores a plurality of the PAN identifiers associated with corresponding ones of the plurality of ZigBee devices included in respective IC Cards; the fault message including the pre-stored PAN identifiers in said memory portion corresponding to corresponding ones of the plurality of PAN identifiers not received for identifying the corresponding ones of the plurality of ZigBee devices as defective devices.

21. The test device according to claim 19 further comprising a matcher for matching the corresponding PAN identifier transmitted by the ZigBee device to the pre-stored PAN identifier in said memory portion.

22. The test device according to claim 19 further comprising a detector for receiving the corresponding PAN identifier when the respective IC Cards are located within a range.

23. A test device for testing a wireless mesh network protocol device included in an IC Card and associated with a Personal Area Network (PAN) identifier, the test device comprising:

a initialization controller for initializing a wireless mesh network protocol network whereto the wireless mesh network protocol device may connect and transmit a corresponding PAN identifier;

a return controller for returning a fault message indicating that the wireless mesh network protocol device is unable to connect and transmit if the corresponding PAN identifier is not received; and a memory portion for pre-storing the PAN identifier;

the fault message including the pre-stored PAN identifier for identifying the wireless mesh network protocol device as a defective device.

24. The test device according to claim 23 further comprising a matcher for matching the corresponding PAN identifier transmitted by the wireless mesh network protocol device to the pre-stored PAN identifier in said memory portion.

25. The test device according to claim 23 further comprising a detector for receiving the corresponding PAN identifier when the respective IC Cards are located within a range.

* * * * *